United States Patent Office 2,953,544
Patented Sept. 20, 1960

2,953,544

POLYESTERS FROM THE HYDROXYPROPYL ETHER OF HYDROQUINONE

Ross M. Hedrick, Dayton, Ohio, assignor to Monsanto Chemical Company, St. Louis, Mo., a corporation of Delaware No Drawing. Filed June 14, 1957, Ser. No. 665,652

3 Claims. (Cl. 260—47)

This invention relates to linear polyesters and more particularly provides new and valuable polyterephthalates.

Linear polyesters are well known in the art; and aliphatic polyesters have long been known to be capable of melt drawings to give filaments. Because of the low melting point of the aliphatic polymers, the art has attempted to improve heat-characteristics by substituting an aromatic component, wholly or in part, for either the hydroxy or the carboxy component. Thus instead of using ethylene glycol with aliphatic dicarboxylic acids, products have been prepared from ethylene glycol and a terephthalic compound, more commonly, by ester-interchange of ethylene glycol with a lower dialkyl terephthalate such as dimethyl terephthalate. While the fiber produced thereby, commonly called "Dacron" or "Terylene" is characterized by very good stability to heat and solvents, considerable difficulty has been experienced in dyeing it.

Accordingly, attempts have been made to increase dyeing properties by introducing dye-receptive radicals, e.g., reactive aromatic rings, into the polyesters. Thus, as described in the British Patent No. 636,429, dated April 26, 1950, ethylene glycol has been replaced by an aromatic component such as hydroquinone diacetate, whereby reaction with an aliphatic dicarboxylic acid such as succinic acid occurred with evolution of by-product acid and formation of a linear polymer.

Fiber-forming polymers have also been formed, as disclosed in the British Patent No. 678,264 dated September 3, 1952, by using with an aromatic carboxy component either a mixture of a glycol and an aromatic dihydroxy compound or the aromatic dihydroxy compound as the sole hydroxy component. Thus dimethyl terephthalate was reacted with a mixture of ethylene glycol and hydroquinone bis(2-hydroxyethyl) ether to give a polymer showing weak-fiber forming properties and a melting point of 197–198° C.

Since crystalline polyethylene terephthalate melts at considerably higher temperatures and has pronounced fiber-forming properties, advantage in dyeing property, if any, was attained only at the sacrifice of desirable properties. I have also found that attempts to increase the melting point of polyesters from hydroquinone bis(2-hydroxyethyl) and dimethyl terephthalate by varying the proportions of ethylene glycol and of said hydroquinone ether with respect to the terephthalate is ineffective in that with increasing melting point there is obtained decrease in crystallinity to the point where a noncrystalline material is obtained. There thus resulted fibers of low tensile strength; orientation could not be effected by drawing.

Now I have found that by using hydroquinone bis(3-hydroxypropyl) ether with ethylene glycol and a terephthalic component selected from the class consisting of terephthalic acid, the acyl halides thereof or the esters of said acid with alkanols of from 1 to 5 carbon atoms or with hydroxyalkanols of from 2 to 5 carbon atoms I obtain crystalline terephthalates of high melting points which give fibers that can be cold-drawn and readily dyed. While hydroquinone bis(3-hydroxypropyl) ether gives crystalline polyesters when reacted with the dialkyl terephthalates in the absence of ethylene glycol, for the production of crystalline polyesters having improved melting points it is recommended that the major proportion of the hydroxy compound be ethylene glycol. Hence, while the present invention provides crystalline, fiber-forming polyterephthalates of good dyeing properties from a mixture consisting of a lower dialkyl terephthalate and hydroquinone bis(3-hydroxypropyl) ether as the only necessary reactants, it also provides improved polyterephthalates which are characterized not only by crystallinity and good dyeing properties but also by exceptionally high melting points, said improved polyterephthalates being obtained by the reaction of a lower dialkyl terephthalate with a mixture of hydroxy compounds consisting of a major proportion of ethylene glycol and a minor proportion of hydroquinone bis(3-hydroxypropyl) ether, e.g., from 51% to 99%, on a molar basis of ethylene glycol and from 1% to 49% of said ether.

In preparing the present polyterephthalates, either from the hydroquinone bis(3-hydroxypropyl) ether as the only hydroxy component or from a mixture of ethylene glycol and said ether as the hydroxy component, I operate substantially as follows:

The dialkyl terephthalate is mixed with the hydroxy component and the resulting mixture is heated in the presence of an acidic or basic catalyst of esterification, e.g., sulfuric acid, 4-toluenesulfonic acid, sodium acetate, zinc borate, sodium methoxide, magnesium oxide or methoxide, litharge, etc. Heating is conducted in an inert atmosphere, e.g., in nitrogen or carbon dioxide, advantageously at a temperature of from, say 190° C. to 300° C., while by-product alcohol, produced by cross-esterification of the dialkyl phthalate with the dihydroxy component, is removed as it is formed. Advantageously, the reaction temperature is gradually brought at ordinary atmospheric pressure to a temperature of, say, 275° C. to 300° C., and reaction is completed within this higher temperature range at subatmospheric pressure, say, at a pressure of from 10 mm. to less than 1 mm. of mercury. When ethylene glycol is part of the hydroxy component, it may be included in a starting charge of dialkyl terephthalate and hydroquinone bis(3-hydroxypropyl) ether, or the reaction mixture may consist initially of only the dialkyl terephthalate and said ether, and the ethylene glycol added either in increments or at once to the reaction mass after reaction has started, conveniently while still operating at atmospheric pressure, i.e., before vacuum is applied.

The progress of the reaction may be readily followed by noting the quantity of by-product alcohol evolved as cross-esterification of the dialkyl terephthalate proceeds. When substantially the equimolar quantity of the alcohol has been evolved, cross-esterification is deemed to have been substantially completed and condensation-polymerization of the resulting hydroxy terephthalate is conducted at subatmospheric pressure. The polymerization is followed by noting the change in viscosity of the reaction mass. The reaction is judged to have been completed when no change in viscosity occurs.

While lower dialkyl terephthalates, i.e., those having from 1 to 5 carbon atoms in the alkyl radical, are generally useful in preparing the present polyterephthalates, dimethyl terephthalate is most advantageously employed in that not only is by-product methanol very easily removed as it is evolved, but also because the cross-esterification reaction is facilitated by using an ester of which the alcohol residue is significantly different with respect to carbon content from that of the glycol. However, either terephthalic acid, the lower dialkyl terephthalates, e.g., diethyl, diisopropyl, di-n-butyl or di-tert-amyl terephthalate, or the lower hydroxyalkyl terephthalates such as the mono- or bis(2-hydroxyethyl) terephthalate or the terephthaloyl halides such as terephthaloyl chloride may be used.

The present polyesters, as herein shown, are crystalline polymers which are readily melt-formed into fibers and films that are capable of being cold-drawn. As easily dyed fibers of very good tensile strength and extremely good heat-stability, they are advantageously employed in the manufacture of textiles and other fibrous structures.

The invention is further illustrated, but not limited, by the following examples:

Example 1

This example describes the preparation of a polyester resin wherein the quantity of hydroquinone bis(3-hydroxypropyl) ether is equivalent to 5 percent of the dimethyl terephthalate on a molar basis.

To a glass flask provided with a thermometer and a condenser leading into a receiver, there were placed 35.0 g. (0.18 mole) of dimethyl terephthalate, 35.0 g. of ethylene glycol, 2.04 g. (0.009 mole) of hydroquinone bis(3-hydroxypropyl) ether, and 0.006 g. of litharge. Nitrogen was supplied to the flask through a capillary which extended into the reaction mixture. The temperature of the reaction mixture was raised rapidly to 195° C., and then gradually to 276° C. over a period of 22 hours while passing nitrogen through the mixture. During the first 2 hours of heating, 14.0 ml. of methanol (approximately the theoretical quantity) was evolved. About three hours after initiation of heating, vacuum was applied and for the subsequent 2 hours the reaction was conducted at from 26.5 mm. to 30.5 mm. of mercury pressure and for the remainder of the reaction period at from 0.2 to 0.3 mm. of mercury pressure.

The product obtained upon allowing the reaction mixture to cool was a white, crystalline material melting at 250° C. When molten it readily formed fibers which could be easily cold-drawn.

For purposes of comparison, the above experiment was repeated, except that instead of using the bis(3-hydroxypropyl) ether of hydroquinone there was used 0.009 mole of bis(2-hydroxyethyl) ether of hydroquinone. The product thus obtained, while crystalline, possessed neither the good color nor the high melting point of that obtained in this example from said bis(3-hydroxypropyl) ether, the melting point of the bis(2-hydroxyethyl) ether product being 225° C.

Example 2

This example is like Example 1, except that there was employed twice the quantity of hydroquinone ether, i.e., there was used either 4.08 g. (0.018 mole) of bis(3-hydroxypropyl) ether of hydroquinone or 3.56 g. (0.018 mole) of bis(2-hydroxyethyl) ether of hydroquinone. Although in both instances there were obtained crystalline polyesters, that made with the hydroxypropyl compound melted at 240° C., whereas that which was prepared from the hydroxyethyl compound melted at 220° C.

Example 3

In this example there was employed 4 times the quantity of hydroquinone ethers used in Example 1. The experiments were performed as described in Example 1, except that there was employed either 8.16 g. (0.036 mole) of hydroquinone bis(3-hydroxypropyl) ether or 7.12 g. (0.036 mole) of hydroquinone bis(2-hydroxypropyl) ether. The product thus obtained with the hydroxypropyl ether was a white crystalline polyester, M.P. 220° C., which formed easily cold-drawn fibers. On the other hand the product which was obtained from the 2-hydroxyethyl ether was non-crystalline. Since the two experiments were conducted under the same conditions, it is evident that the use of 20 mole percent of the hydroxyethyl ether, based on the terephthalate, prevents crystallinity, whereas the use of this same proportion of the hydroxypropyl ether has no such effect.

Example 4

A mixture consisting of 17.5 g. (0.09 mole) of dimethyl terephthalate, 10.17 g. (0.045 mole) of hydroquinone bis(3-hydroxypropyl) ether, 10 ml. of ethylene glycol and 0.003 g. of litharge was placed in a Teflon coated tube and heated on the oil-bath in a nitrogen atmosphere at a temperature of from 215–290° C. for about 22 hours, vacuum being applied after five hours of heating to bring the reaction pressure to from 0.2–0.3 mm. Upon cooling there was obtained a crystalline polyester. Fibers formed from the melt thereof could be cold-drawn. Accordingly, this example shows that hydroquinone bis(3-hydroxypropyl) ether can be used in a quantity which is half that of the terephthalate on a molar basis to give a fiber-forming crystalline polyester. Since the hydroquinones are comparatively large molecules the weight ratio, of course, of the hydroquinone derivative to the terephthalate is considerably greater than that of the ethylene glycol.

Example 5

This example shows the use of hydroquinone bis(3-hydroxypropyl) ether in equimolar proportion with respect to the terephthalate.

A mixture consisting of 17.8 g. (0.0917 mole) of dimethyl terephthalate, 20.34 g. (0.090 mole) of hydroquinone bis(3-hydroxypropyl) ether and 0.003 g. of litharge was heated in a nitrogen atmosphere on an oil-bath at a temperature of 198–217° C. for about 2 hours, and 2 ml. of ethylene glycol was then added thereto. Heating was then continued for an additional 20 hours, during which time a vacuum was applied to effect the reaction at a pressure of 2–3 mm. of mercury during the last 17 hours.

The product thus obtained upon cooling was a crystalline polyester. Fibers were readily formed from the molten product.

What I claim is:

1. The crystalline, linear, fiber-forming polyester condensation product of a terephthalic component selected from the class consisting of terephthalic acid, a terephthaloyl halide, an alkyl terephthalate having from 1 to 5 carbon atoms in the alkyl radical and a hydroxyalkyl terephthalate having from 2 to 5 carbon atoms in the hydroxyalkyl radical with a dihydroxy component which is a mixture consisting essentially, on a molar basis, of a major proportion of ethylene glycol and a minor proportion of hydroquinone bis(3-hydroxypropyl) ether.

2. The crystalline, linear, fiber-forming polyester condensation product of substantially one mole of an alkyl terephthalate having from 1 to 5 carbon atoms in the alkyl radical, with a dihydroxy component which is a mixture consisting essentially, on a molar basis, of a major proportion of ethylene glycol and a minor proportion of hydroquinone bis(3-hydroxypropyl) ether.

3. The crystalline, linear, fiber-forming polyester condensation product of dimethyl terephthalate and a dihydroxy component which is a mixture consisting essentially, on a molar basis, of a major proportion of ethylene glycol and a minor proportion of hydroquinone bis(3-hydroxypropyl) ether.

References Cited in the file of this patent

UNITED STATES PATENTS 2,626,939    Hoogsteen _____ Jan. 27, 1953

FOREIGN PATENTS 678,264    Great Britain _____ Sept. 3, 1952